(No Model.) 2 Sheets—Sheet 1.

D. E. McSHERRY & A. G. MYERS.
SEEDING MACHINE.

No. 280,387. Patented July 3, 1883.

WITNESSES: Jas. F. DuHamel, Walter S. Dodge.

INVENTORS: Daniel E. McSherry, Andrew G. Myers, by Dodge Son, Atty.

(No Model.) 2 Sheets—Sheet 2.

D. E. McSHERRY & A. G. MYERS.
SEEDING MACHINE.

No. 280,387. Patented July 3, 1883.

WITNESSES.
Jas. F. DuHamel.
Walter S. Dodge.

INVENTORS
Daniel E. McSherry,
Andrew G. Myers,
by Dodge Son,
Attys.

United States Patent Office.

DANIEL E. McSHERRY AND ANDREW G. MYERS, OF DAYTON, OHIO; SAID MYERS ASSIGNOR TO EDWARD BRENEMAN, OF SAME PLACE.

SEEDING-MACHINE.

SPECIFICATION forming part of Letters Patent No. 280,387, dated July 3, 1883.

Application filed March 13, 1883. (No model.)

*To all whom it may concern:*

Be it known that we, DANIEL E. MCSHERRY and ANDREW G. MYERS, both of Dayton, in the county of Montgomery and State of Ohio, have invented certain Improvements in Seeding-Machines, of which the following is a specification.

Our invention relates to seeding-machines; and it consists in a novel arrangement of mechanism for elevating and depressing the runners, teeth, or drag-bars, as the case may be, the improved mechanism being applicable generally to all that class of machines in which drag-bars, hoes, and the like are employed.

Figure 1:
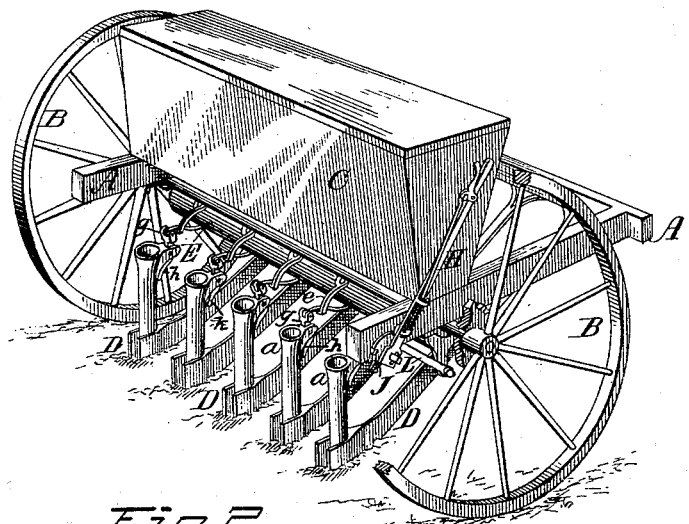
Figure 2:
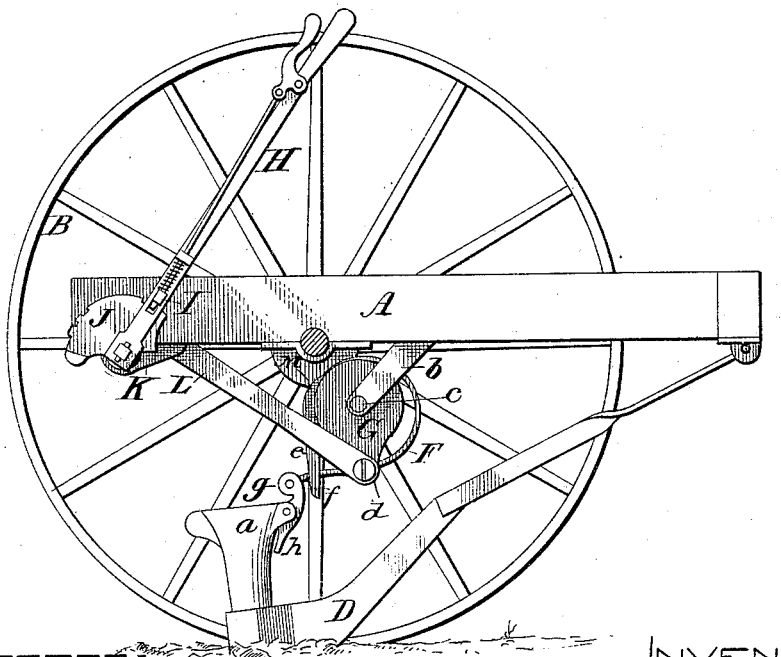
Figure 3:
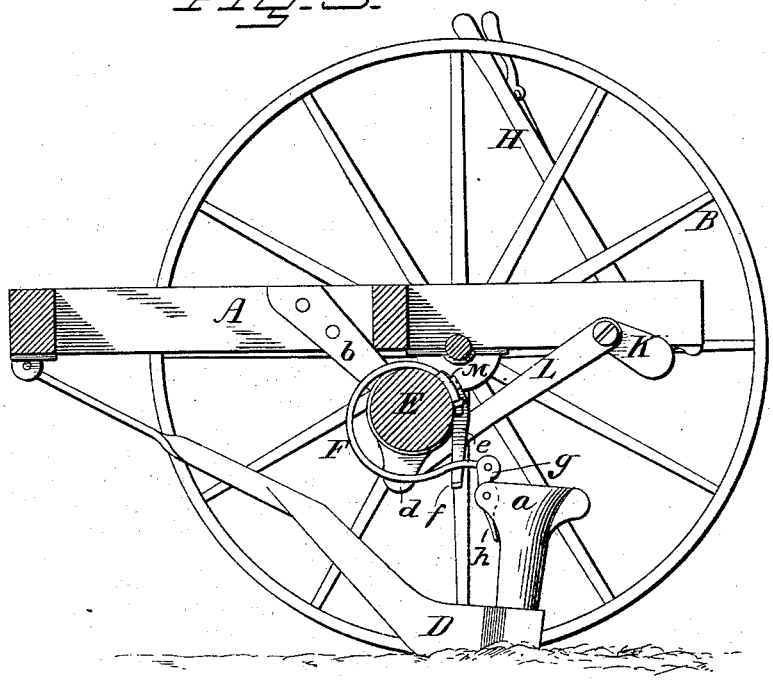
Figure 4:
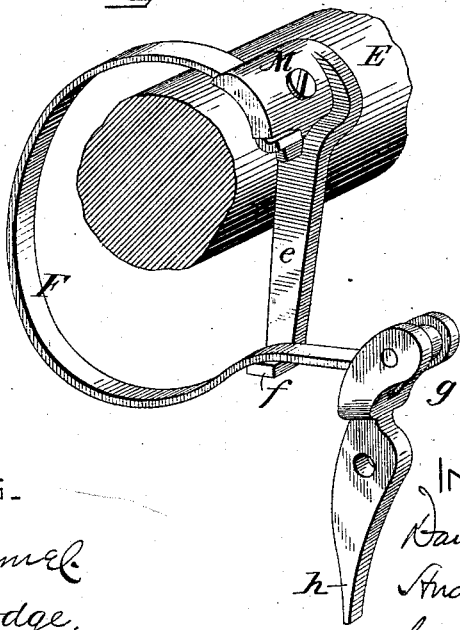

In the drawings, Figure 1 represents a perspective view of our improved machine; Fig. 2, an end elevation of the same, with one wheel removed; Fig. 3, a section from front to rear; Fig. 4, an enlarged view, showing the spring-clamp and lifting-arm in perspective.

Various forms of mechanism have heretofore been patented for raising and lowering the drag-bars, runners, or hoes of seeding-machines, drills, &c.; but the device which we shall now describe is designed to simplify such mechanism and render it more compact.

To this end the invention consists in providing a rock-shaft to which the springs are attached, which bear upon and press down the drag-bars or runners, the clips or fastenings by which the springs are secured being formed each with a depending arm, having a lateral stud or projection, which extends beneath the spring and serves to raise the same, and with it the drag-bar or runner. This will be more readily understood upon referring to the drawings, in which said parts are represented, in connection with a hand-lever for turning the rock-shaft, and means for locking the hand-lever at any desired adjustment.

A represents the frame of the machine, mounted upon wheels B, and bearing the usual seed-hopper, C, as shown in Fig. 1.

D indicates the runners or drag-bars, provided with seed-tubes a, to which seed is conducted, by flexible tubes or otherwise, from any suitable distributing or feeding devices properly applied to the hopper. As this invention has no relation to the distributing devices, it is not deemed necessary to show such devices in the drawings. Each drag-bar or runner D is jointed to the frame A at its forward end, and is free to rise and fall, as usual, with said joint as a center of motion.

E represents a rock-shaft extending from side to side of frame A, parallel with the axle, its ends being journaled in suitable hangers, b, secured to the frame. This rock-shaft we prefer to make of wood, because of its superior lightness and cheapness, and because it is desirable to make it of considerable diameter to afford a good bearing for the ends of the springs F, which are secured to it. The ends of the rock-shaft are covered with metal caps G, on which are formed the journals or gudgeons c, and one of which is formed with an arm or extension, d, to which to attach the operating devices. These devices consist of a hand-lever, H, provided with a locking-dog, I, to engage with a notched rack, J, a rock-shaft carrying the hand-lever at one end and a crank-arm, K, at the other end, and a rod or pitman, L, connecting the crank-arm and the arm of extension d of cap G. It will be seen that if the hand-lever be moved back or forward it will cause the rock-shaft E to rock or turn, and to carry with it the entire series of springs F.

Referring now to Fig. 4, the form and the manner of applying the springs will be seen. M indicates a clamping plate or clip, curved to correspond to the contour of the rock-shaft, recessed on its inner face to receive the spring, which is coiled around the rock-shaft and extends beneath and in rear of the same, and provided with a depending arm, e, having a lateral stud or projection, f, which projects beneath the lower end of the spring and serves to lift the latter when the rock-shaft is turned forward or in a direction to cause the elevation of arm e. By coiling the spring about the rock-shaft or carrying it from the upper side down under and back of the same the space required is very small, and a long elastic spring is secured. The outer or moving end of the spring is connected with the seed-tube a by an intermediate link or coupling, g, jointed to ears at the top and forward side of the seed-tube, and likewise jointed to the end of the spring, said link permitting the spring to move freely and without unduly drawing upon or forcing back the said tube. As shown in the several figures, the springs do not lie close against the rock-shaft except at the point of attachment, but are thrown out therefrom sufficiently to give all necessary room for play or movement. The lifting-arm e and its stud or projection f are arranged in such relation to the moving end of the spring as to cause the stud to engage thereunder close to the link g, in order that the body of the spring may be entirely relieved of the weight of the drag-bar or runner. When the rock-shaft E is turned in the direction to cause the springs to press the runners or drag-bars downward, the stud f moves downward away from the spring, and allows it to act freely and without impediment. It will thus be seen that the depression is effected through the force and pressure of the springs, while in lifting no spring action occurs, but the force is applied in a direct and positive manner close to the seed-tube a, in a way equivalent to raising by direct connection with the seed-tubes. As shown in the several figures, each link g is formed with a tail or extension, h, which comes in contact with the seed-tube when the pressure of the spring is applied, preventing the link from swinging freely forward, and thereby destroying the effect of the spring, as might otherwise happen.

Instead of employing a special rock-shaft for the hand-lever and intermediate connections between the same and the rock-shaft carrying the springs, the hand-lever may obviously be applied directly to the latter rock-shaft.

We are aware that it is not broadly new to attach depressing-springs to a rock-shaft, and to vary or remove the pressure by rocking said shaft, and hence we do not broadly claim said idea.

Having thus described our invention, what we claim is—

1. In combination with a seeder-frame, a drag-bar or runner, a rock-shaft provided with a spring, and a link connecting one end of the spring and the drag-bar or its seed-tube, substantially as shown and described.

2. In combination with runner or drag-bar D, rock-shaft E, spring F, link g, and means, substantially such as described, for rocking or turning the shaft.

3. In a seeding-machine, the combination of drag-bar or runner D, rock-shaft E, provided with arm d, and spring F, link g, and hand-lever H, and intermediate pitman, L, connecting the hand-lever and arm d.

4. In combination with a seeder-frame, a pivoted runner or drag-bar, and a rock-shaft provided with a spring and with a lifting-arm extending beneath the spring, said spring being connected with the runner or drag-bar, substantially as shown and described.

5. In combination with frame A, drag-bars or runners D, rock-shaft E, springs F, attached to the rock-shaft and connected with the drag-bars or their seed-tubes, and lifting-arm e, all arranged and operating substantially as explained.

6. In a seeding-machine, the combination, with a drag-bar or runner, of a rock-shaft, a spring connected with the drag-bar or runner, and a combined clamp and lifting-arm, substantially as shown and described, adapted to clamp the spring to the rock-shaft and to the drag-bar or runner.

7. In combination with rock-shaft E and spring F, the clamp M, provided with arm e, having stud or projection f, as and for the purpose set forth.

8. In combination with seed-tube a and spring F, intermediate link, g, having tail or extension h, and serving to connect the spring and tube, substantially as and for the purpose set forth.

DANIEL E. McSHERRY.
ANDREW G. MYERS.

Witnesses:
JOHN A. SHAUCK,
S. BOLTIN.